(12) United States Patent
Watarai

(10) Patent No.: US 10,107,377 B2
(45) Date of Patent: Oct. 23, 2018

(54) BICYCLE SPROCKET

(71) Applicant: SHIMANO INC., Sakai (JP)

(72) Inventor: Etsuyoshi Watarai, Sakai (JP)

(73) Assignee: SHIMANO INC., Sakai (JP)

( * ) Notice: Subject to any disclaimer, the term of this patent is extended or adjusted under 35 U.S.C. 154(b) by 189 days.

(21) Appl. No.: 14/468,283

(22) Filed: Aug. 25, 2014

(65) Prior Publication Data

US 2016/0053882 A1   Feb. 25, 2016

(51) Int. Cl.
  *F16H 55/30* (2006.01)
  *B62M 9/10* (2006.01)

(52) U.S. Cl.
  CPC ............... *F16H 55/30* (2013.01); *B62M 9/10* (2013.01)

(58) Field of Classification Search
  CPC ................................. F16H 55/30; B62M 9/10
  See application file for complete search history.

(56) References Cited

U.S. PATENT DOCUMENTS

| | | | | |
|---|---|---|---|---|
| 355,513 A * | 1/1887 | Dodge | ................... | F16H 55/30 474/164 |
| 465,141 A * | 12/1891 | McCray | ................... | F16H 55/30 474/156 |
| 495,584 A * | 4/1893 | Guthrie | ................... | F16H 55/30 474/156 |
| 616,072 A * | 12/1898 | Bradley | ................... | F16H 55/30 474/156 |
| 1,201,748 A * | 10/1916 | Luce | ................... | F16H 55/30 474/156 |
| 1,556,878 A * | 10/1925 | Pritchard | ................ | F16H 55/30 474/49 |
| 1,835,406 A * | 12/1931 | Kirsten | ................... | F16G 13/04 474/156 |
| 2,613,546 A * | 10/1952 | Jorgensen | ............... | F16G 13/10 474/210 |
| 5,397,280 A * | 3/1995 | Skurka | ................... | F01L 1/02 474/156 |
| 5,690,571 A * | 11/1997 | Mott | ................... | F16G 13/06 474/212 |
| 5,733,215 A * | 3/1998 | Hsu | ................... | B62M 9/10 474/160 |
| 6,387,001 B1 * | 5/2002 | Markley | ................. | F16G 13/06 474/202 |
| 6,575,861 B2 * | 6/2003 | Markley | ................. | F16H 55/30 474/152 |
| 7,059,985 B2 * | 6/2006 | Markley | ................. | F16H 55/30 474/206 |
| 2008/0293528 A1 | 11/2008 | Paull | | |
| 2014/0364259 A1 * | 12/2014 | Reiter | .................. | F16H 55/30 474/155 |

* cited by examiner

*Primary Examiner* — Minh Truong
(74) *Attorney, Agent, or Firm* — Mori & Ward, LLP

(57) ABSTRACT

A bicycle sprocket has a rotational center axis. The bicycle sprocket comprises a sprocket body, a plurality of sprocket teeth, and at least one chain-supporting portion. The plurality of sprocket teeth are circumferentially arranged on an outer periphery of the sprocket body. The at least one chain-supporting portion is configured to contact one of inner link plates of a bicycle chain without engaging with the bicycle chain at inner link spaces each defined between a pair of inner link plates that face each other in an axial direction parallel to the rotational center axis. The at least one chain-supporting portion is offset from the sprocket teeth in the axial direction.

21 Claims, 13 Drawing Sheets

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket has a rotational center axis. The bicycle sprocket comprises a sprocket body, a plurality of sprocket teeth, and at least one chain-supporting portion. The plurality of sprocket teeth are circumferentially arranged on an outer periphery of the sprocket body. The at least one chain-supporting portion is configured to contact one of inner link plates of a bicycle chain without engaging with the bicycle chain at inner link spaces each defined between a pair of inner link plates that face each other in an axial direction parallel to the rotational center axis. The at least one chain-supporting portion is offset from the sprocket teeth in the axial direction.

In accordance with a second aspect of the present invention, the bicycle sprocket according to the first aspect is configured so that the at least one chain-supporting portion includes a plurality of chain-supporting portions each configured to contact one of the inner link plates of the bicycle chain without engaging with the bicycle chain at the inner link spaces each defined between the pair of inner link plates that face each other in the axial direction.

In accordance with a third aspect of the present invention, the bicycle sprocket according to the first aspect is configured so that the bicycle sprocket has a first axial side and a second axial side opposite to the first axial side. The at least one chain-supporting portion is positioned closer to one of the first axial side and the second axial side than the other of the first axial side and the second axial side in the axial direction.

In accordance with a fourth aspect of the present invention, the bicycle sprocket according to the first aspect is configured so that the bicycle sprocket has a first axial side and a second axial side opposite to the first axial side. The at least one chain-supporting portion includes a first chain-supporting portion and a second chain-supporting portion which are each configured to contact one of the inner link plates of the bicycle chain without engaging with the bicycle chain at the inner link spaces each defined between the pair of inner link plates that face each other in the axial direction. The first chain-supporting portion is positioned closer to the first axial side than the second axial side in the axial direction. The second chain-supporting portion is positioned closer to the second axial side than the first axial side in the axial direction.

In accordance with a fifth aspect of the present invention, the bicycle sprocket according to the fourth aspect is configured so that the first chain-supporting portion is aligned with the second chain-supporting portion in the axial direction.

In accordance with a sixth aspect of the present invention, the bicycle sprocket according to the first aspect further comprises at least one additional chain-supporting portion configured to contact one of outer link plates of the bicycle chain without engaging with the bicycle chain at outer link spaces each defined between a pair of outer link plates that face each other in the axial direction. The at least one additional chain-supporting portion is offset from the sprocket teeth in the axial direction.

In accordance with a seventh aspect of the present invention, the bicycle sprocket according to the sixth aspect is configured so that the at least one additional chain-supporting portion includes a plurality of additional chain-supporting portions each configured to contact one of the outer link plates of the bicycle chain without engaging with the bicycle chain at the outer link spaces each defined between the pair of outer link plates that face each other in the axial direction.

In accordance with an eighth aspect of the present invention, the bicycle sprocket according to the sixth aspect is configured so that the bicycle sprocket has a first axial side and a second axial side opposite to the first axial side. The at least one additional chain-supporting portion is positioned closer to one of the first axial side and the second axial side than the other of the first axial side and the second axial side in the axial direction.

In accordance with a ninth aspect of the present invention, the bicycle sprocket according to the sixth aspect is configured so that the bicycle sprocket has a first axial side and a second axial side opposite to the first axial side. The at least one additional chain-supporting portion includes a first additional chain-supporting portion and a second additional chain-supporting portion which are each configured to contact one of the outer link plates of the bicycle chain without engaging with the bicycle chain at the outer link spaces each defined between the pair of outer link plates that face each other in the axial direction. The first additional chain-supporting portion is positioned closer to the first axial side than the second axial side in the axial direction. The second additional chain-supporting portion is positioned closer to the second axial side than the first axial side in the axial direction.

In accordance with a tenth aspect of the present invention, the bicycle sprocket according to the ninth aspect is configured so that the first additional chain-supporting portion is aligned with the second additional chain-supporting portion in the axial direction.

In accordance with an eleventh aspect of the present invention, the bicycle sprocket according to the first aspect is configured so that each of the plurality of sprocket teeth has a chain-engaging axial width that is larger than an axial width of the inner link spaces each defined between the pair of inner link plates of the bicycle chain and that is equal to or smaller than an axial width of the outer link spaces each defined between the pair of outer link plates of the bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
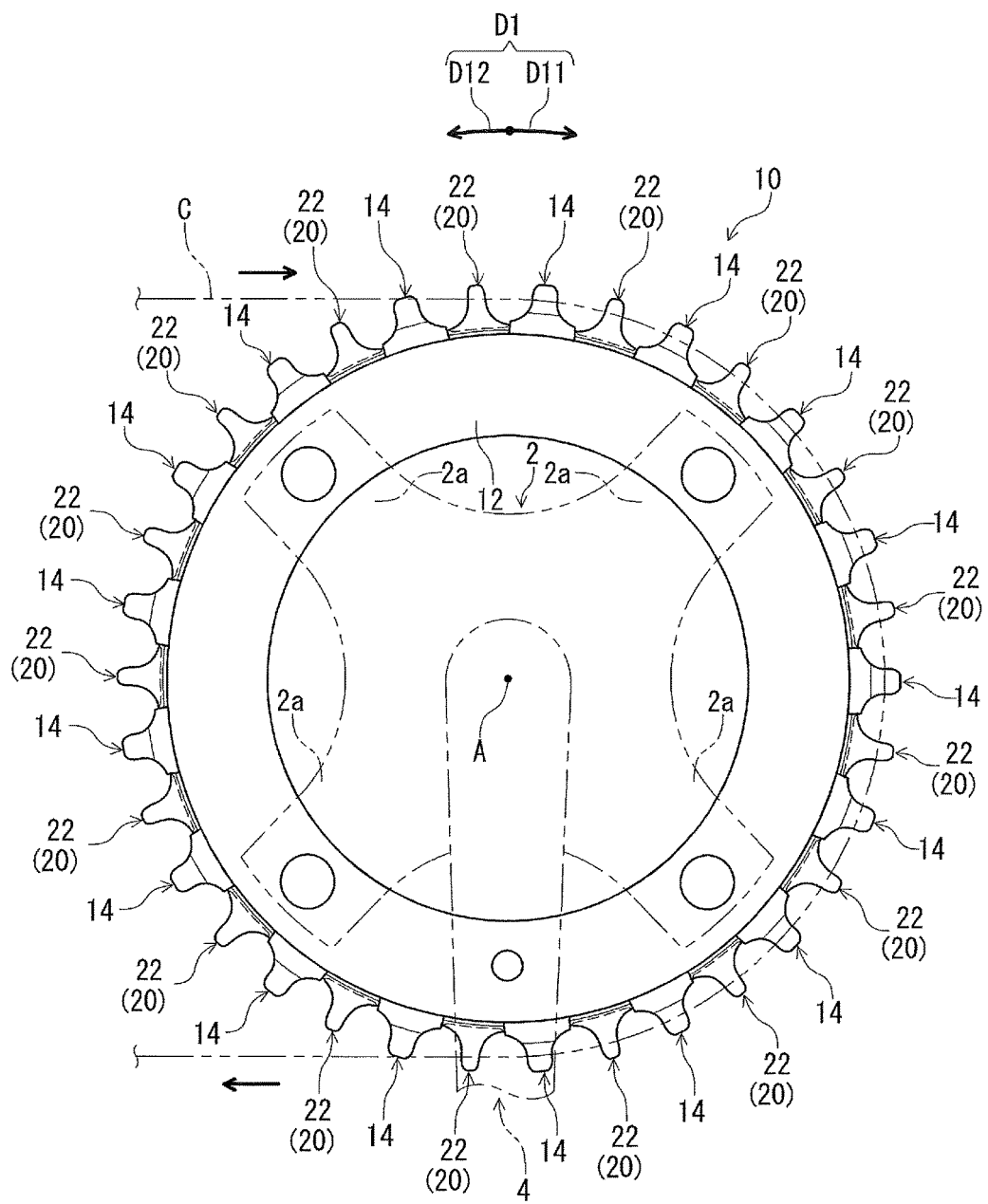
FIG. 1 is an elevational view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with a first embodiment is configured to engage with a bicycle chain C. The bicycle sprocket 10 has a rotational center axis A and is rotatable about the rotational center axis A. In the illustrated embodiment, the bicycle sprocket 10 is a front sprocket configured to be provided on a gear crank (right crank) of a bicycle (not shown). Structures of the bicycle sprocket 10 can, however, be applied to a rear sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle with facing a handlebar (not shown). Accordingly, these terms, as utilized to describe the bicycle sprocket 10, should be interpreted relative to the bicycle equipped with the bicycle sprocket 10 as used in an upright riding position on a horizontal surface.

The bicycle sprocket 10 comprises a sprocket body 12. In the illustrated embodiment, the sprocket body 12 has an annular shape and is configured to be fastened to crank connecting arms 2a of a sprocket mounting member 2 by bolts (not shown). The sprocket mounting member 2 is fastened on a crank arm 4 to be rotatable integrally with the crank arm 4 about the rotational center axis A. The sprocket mounting member 2 can also be integrally provided with the crank arm 4 as a single unitary member. The bicycle sprocket 10 is configured to be rotatable integrally with the sprocket mounting member 2 and the crank arm 4 about the rotational center axis A.

The bicycle sprocket 10 is configured to be rotated about the rotational center axis A in a rotational driving direction D11 during the pedaling. The rotational driving direction D11 is defined along a circumferential direction D1 of the bicycle sprocket 10. A direction D12 is defined along the circumferential direction D1. The direction D12 is opposite to the rotational driving direction D11.

As seen in FIG. 1, the bicycle sprocket 10 comprises a plurality of sprocket teeth 14. The plurality of sprocket teeth 14 are circumferentially arranged on an outer periphery of the sprocket body 12. The sprocket teeth 14 are spaced apart from each other in the circumferential direction D1. The sprocket teeth 14 radially outwardly protrude from the sprocket body 12. The sprocket teeth 14 have the same shape as each other in the illustrated embodiment. Some of the sprocket teeth 14 may have different shapes from the other of the sprocket teeth 14.

In the illustrated embodiment, the sprocket teeth 14 and the sprocket body 12 comprise a metallic material such as iron or titanium. The sprocket teeth 14 are integrally provided with the sprocket body 12 as a single unitary member. The sprocket teeth 14 can, however, be separately provided from the sprocket body 12. In the case of the sprocket teeth 14 being separately provided from the sprocket body 12, the sprocket body 12 can be made of a non-metallic material such as a fiber-reinforced composite material.

Figure 2:
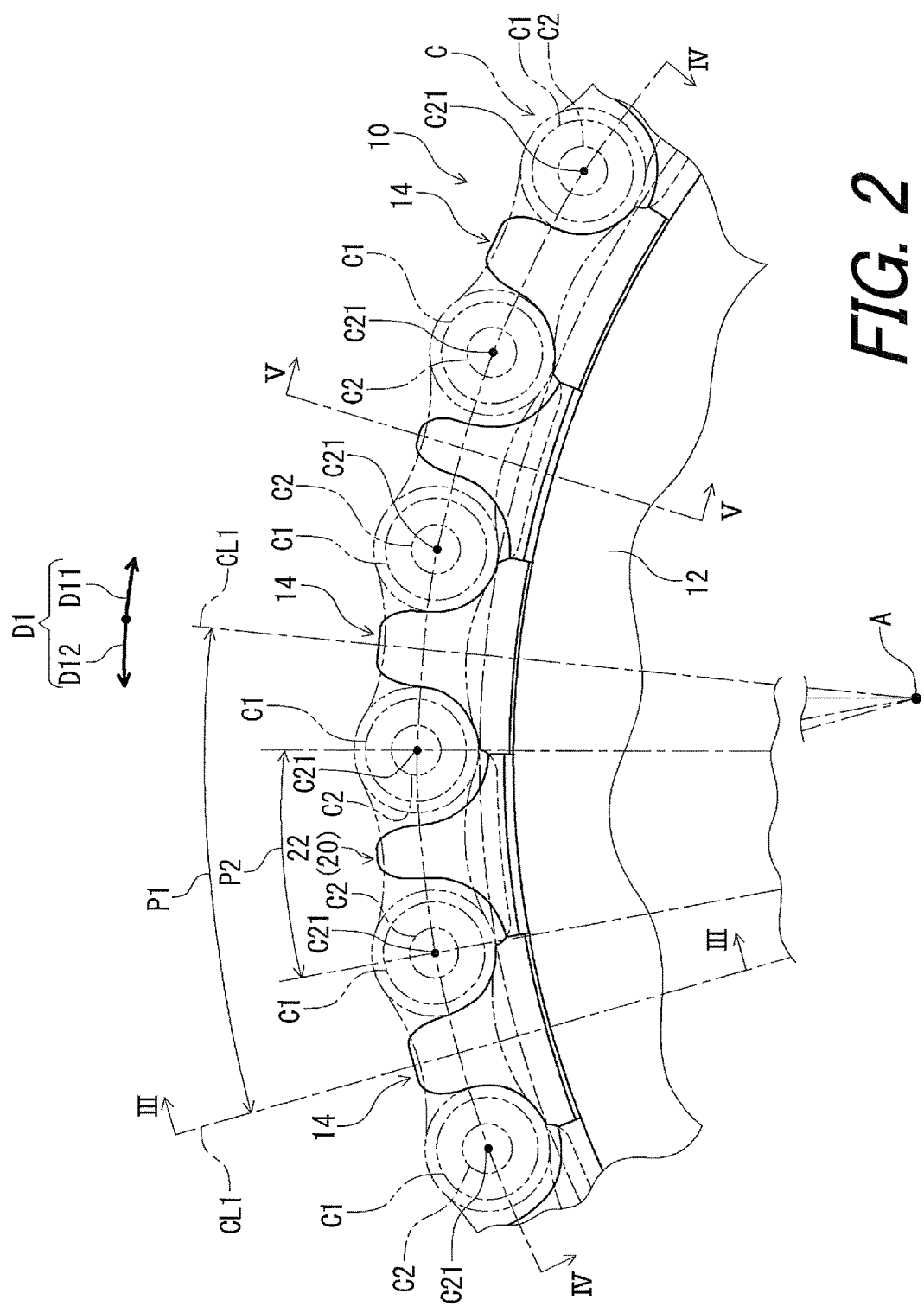
FIG. 2 is a partial enlarged elevational view of the bicycle sprocket illustrated in FIG. 1.

As seen in FIG. 2, each of the sprocket teeth 14 is configured to engage with the bicycle chain C to transmit a rotational force between the bicycle sprocket 10 and the bicycle chain C. A tooth pitch P1 defined between adjacent two of the sprocket teeth 14 is twice as long as a roller pitch P2 defined between adjacent two of rollers C1 of the bicycle chain C. Each of the tooth pitch P1 and the roller pitch P2 is defined as an angular range about the rotational center axis A. The tooth pitch P1 is defined between circumferential center lines CL1 of adjacent two of the sprocket teeth 14. The roller pitch P2 is defined between center axes C21 of adjacent two of pins C2.

Figure 3:
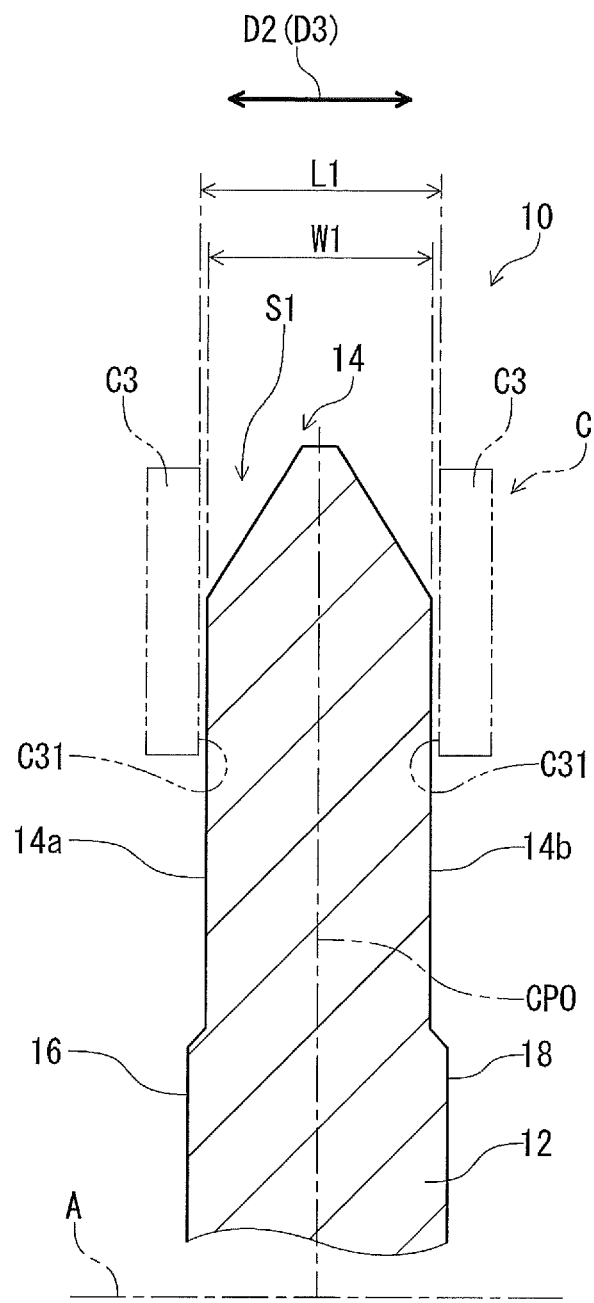
FIG. 3 is a cross-sectional view of the bicycle sprocket taken along line III-III of FIG. 2.

As seen in FIG. 3, the sprocket teeth 14 is configured to engage with the bicycle chain C at outer link spaces S1 each defined between a pair of outer link plates C3 that face each other in an axial direction D2 parallel to the rotational center axis A. The sprocket teeth 14 is configured not to engage with the bicycle chain C at inner link spaces S2 each defined between a pair of inner link plates C4 that face each other in the axial direction D2.

Figure 4:
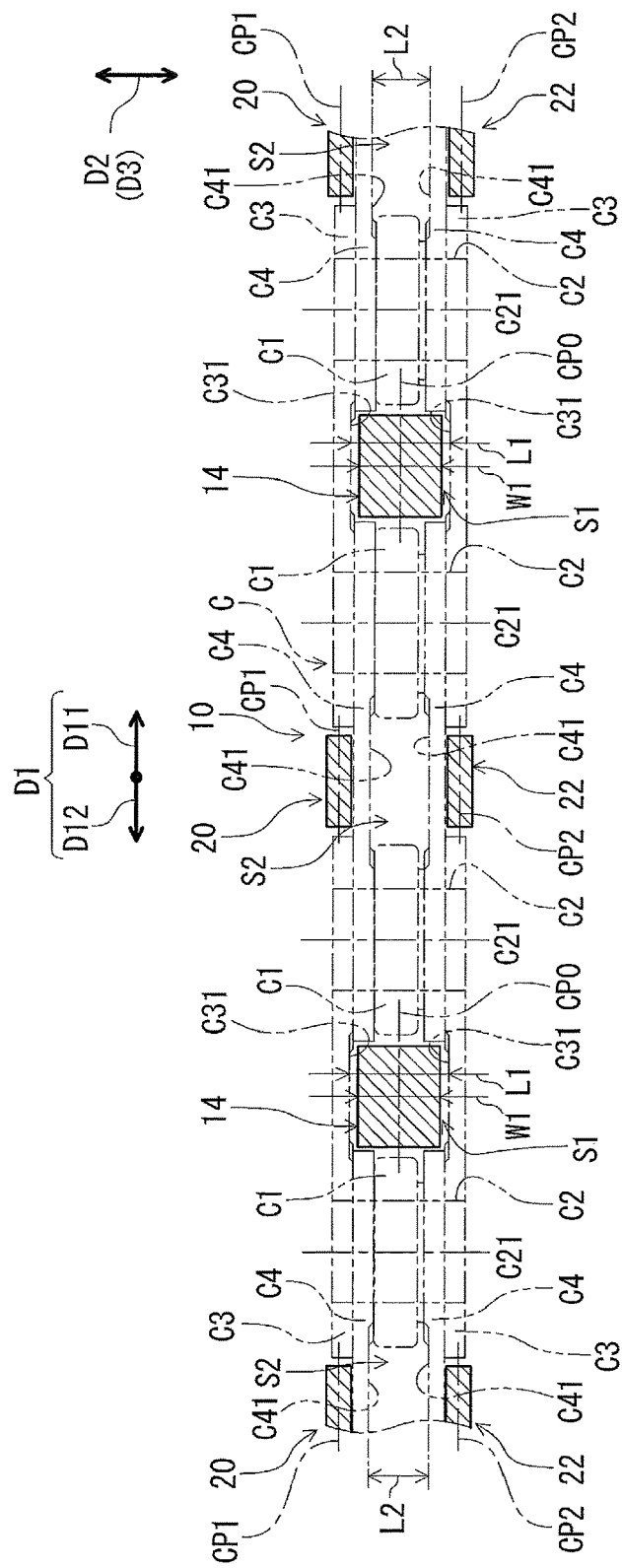
FIG. 4 is a cross-sectional view of the bicycle sprocket taken along line IV-IV of FIG. 2.

As seen in FIG. 4, each of the plurality of sprocket teeth 14 has a chain-engaging axial width W1 that is larger than an axial width of the inner link spaces S2 each defined between the pair of inner link plates C4 of the bicycle chain C and that is equal to or smaller than an axial width of the outer link spaces S1 each defined between the pair of outer link plates C3 of the bicycle chain C.

As seen in FIG. 3, each of the sprocket teeth 14 has a first chain-engaging surface 14a and a second chain-engaging surface 14b. The first chain-engaging surface 14a and the second chain-engaging surface 14b face in the axial direction D2. The first chain-engaging surface 14a and the second chain-engaging surface 14b are contactable with opposed inner surfaces C31 of the outer link plates C3, respectively. For example, the chain-engaging axial width W1 is a maximum axial width defined between the first chain-engaging surface 14a and the second chain-engaging surface 14b in the axial direction D2.

As seen in FIG. 4, the chain-engaging axial width W1 is smaller than an outer-link axial distance L1 defined between the opposed inner surfaces C31 of the outer link plates C3. The chain-engaging axial width W1 is larger than an inner-link axial distance L2 defined between opposed inner surfaces C41 of the inner link plates C4.

The outer-link axial distance L1 is defined between the opposed inner surfaces C31 of the outer link plates C3 in a direction D3 parallel to the center axes C21 of the pins C2. The inner-link axial distance L2 is defined between the opposed inner surfaces C41 of the inner link plates C4 in the direction D3 parallel to the center axes C21 of the pins C2. In a state where the bicycle chain C engages with the sprocket teeth 14, the axial direction D2 coincides with the direction D3 defined with respect to the bicycle chain C.

As seen in FIG. 4, the sprocket teeth 14 are aligned in the circumferential direction D1. More specifically, each of the sprocket teeth 14 has a reference axial center plane CP0 defined at a center position of each of the sprocket teeth 14 in the axial direction D2. The reference axial center planes CP0 of the sprocket teeth 14 are disposed at the same position in the axial direction D2.

As seen in FIG. 3, the reference axial center plane CP0 is defined at a center position between the first chain-engaging surface 14a and the second chain-engaging surface 14b in the axial direction D2. The reference axial center plane CP0 is perpendicular to the rotational center axis A. While each of the sprocket teeth 14 has a symmetrical shape with respect to the reference axial center plane CP0, each of the sprocket teeth 14 can have an asymmetrical shape with respect to the reference axial center plane CP0.

As seen in FIG. 3, the bicycle sprocket 10 has a first axial side 16 and a second axial side 18 opposite to the first axial side 16. In the illustrated embodiment, the first axial side 16 and the second axial side 18 are provided on the sprocket body 12. In the illustrated embodiment, the reference axial center plane CP0 is disposed at a center position between the first axial side 16 and the second axial side 18 in the axial direction D2.

Figure 5:
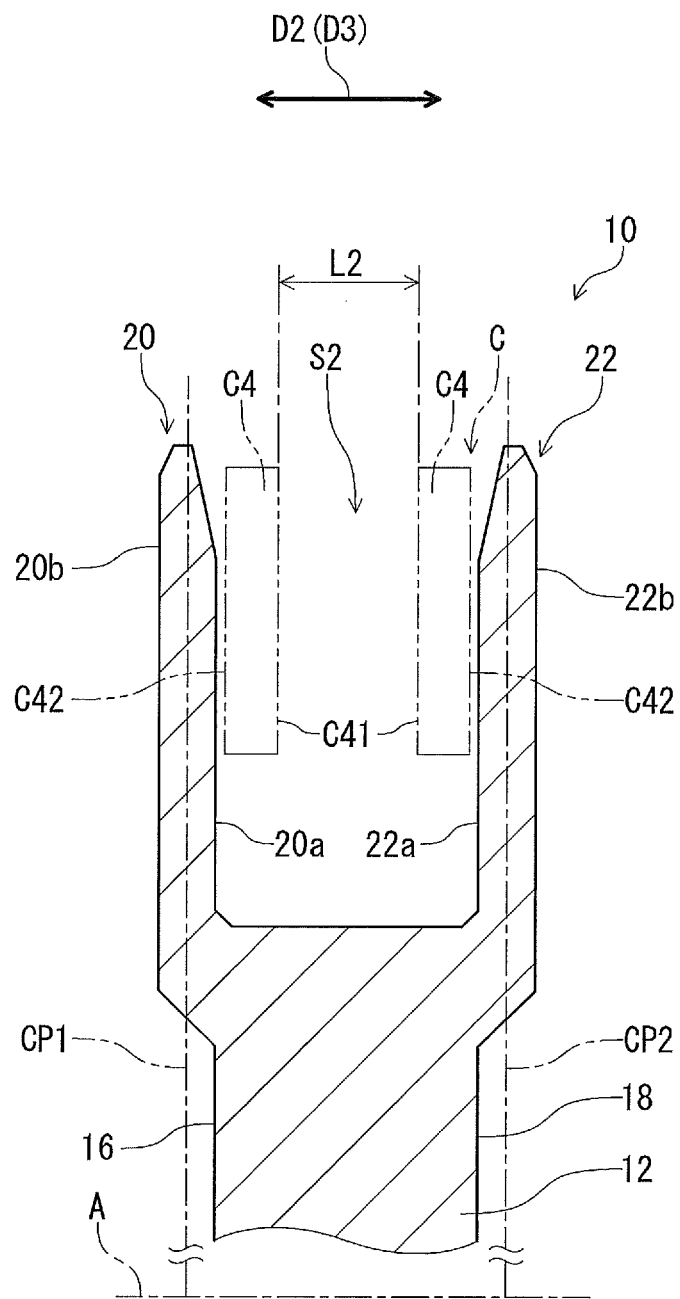
FIG. 5 is a cross-sectional view of the bicycle sprocket taken along line V-V of FIG. 2.

As seen in FIG. 1, the bicycle sprocket 10 comprises at least one chain-supporting portion 20 and/or 22. The at least one chain-supporting portion 20 and/or 22 is provided on and protrudes from the outer periphery of the sprocket body 12. As seen in FIGS. 4 and 5, the at least one chain-supporting portion 20 and/or 22 is configured to contact one of the inner link plates C4 of the bicycle chain C without engaging with the bicycle chain C at the inner link spaces S2 each defined between the pair of inner link plates C4 that face each other in the axial direction D2 parallel to the rotational center axis A.

In the illustrated embodiment, as seen in FIG. 4, the at least one chain-supporting portion 20 and/or 22 includes a plurality of chain-supporting portions 20 and 22 each configured to contact one of the inner link plates C4 of the bicycle chain C without engaging with the bicycle chain C at the inner link spaces S2 each defined between the pair of inner link plates C4 that face each other in the axial direction D2. The at least one chain-supporting portion 20 and/or 22 includes a first chain-supporting portion 20 and a second chain-supporting portion 22.

In the illustrated embodiment, the chain-supporting portions 20 and 22 include a plurality of first chain-supporting portions 20 and a plurality of second chain-supporting portions 22. The first chain-supporting portion 20 and the second chain-supporting portion 22 are each configured to contact one of the inner link plates C4 of the bicycle chain C without engaging with the bicycle chain C at the inner link spaces S2 each defined between the pair of inner link plates C4 that face each other in the axial direction D2.

As seen in FIG. 4, the at least one chain-supporting portion 20 and/or 22 is offset from the sprocket teeth 14 in the axial direction D2. In the illustrated embodiment, each of the first chain-supporting portions 20 is offset from the sprocket teeth 14 in the axial direction D2. Each of the second chain-supporting portions 22 is offset from the sprocket teeth 14 in the axial direction D2. More specifically, each of the first chain-supporting portions 20 and each of the second chain-supporting portions 22 are offset from the reference axial center planes CP0 of the sprocket teeth 14 in the axial direction D2. The reference axial center planes CP0 of the sprocket teeth 14 are disposed between the first chain-supporting portions 20 and the second chain-supporting portions 22 in the axial direction D2.

The first chain-supporting portion 20 is preferably aligned with the second chain-supporting portion 22 in the axial direction D2. The first chain-supporting portion 20 is arranged to face the second chain-supporting portion 22 in the axial direction D2. The first chain-supporting portion 20 is disposed at a circumferential position same as a circumferential position of the second chain-supporting portion 22 in the circumferential direction D1. The pair of inner link plates C4 are partially disposed between the first chain-supporting portion 20 and the second chain-supporting portion 22 which face each other in the axial direction D2 in a state where the bicycle chain C at least partially engages with the sprocket teeth 14.

As seen in FIG. 4, the first chain-supporting portions 20 are aligned with each other in the circumferential direction D1. The second chain-supporting portions 22 are aligned with each other in the circumferential direction D1. Each of the first chain-supporting portions 20 has a first axial center plane CP1 defined at a center position of each of the first chain-supporting portions 20 in the axial direction D2. The first axial center planes CP1 are disposed at the same position in the axial direction D2. Each of the second chain-supporting portions 22 has a second axial center plane CP2 defined at a center position of each of the second chain-supporting portions 22 in the axial direction D2. The second axial center planes CP2 are disposed at the same position in the axial direction D2.

As seen in FIG. 5, the at least one chain-supporting portion 20 and/or 22 is positioned closer to one of the first axial side 16 and the second axial side 18 than the other of the first axial side 16 and the second axial side 18 in the axial direction D2. In the illustrated embodiment, the first chain-supporting portion 20 is positioned closer to the first axial side 16 than the second axial side 18 in the axial direction D2. The second chain-supporting portion 22 is positioned closer to the second axial side 18 than the first axial side 16 in the axial direction D2.

Each of the first chain-supporting portions 20 has a first support surface 20a and a first outer surface 20b. Each of the first support surface 20a and the first outer surface 20b faces in the axial direction D2. The first support surface 20a is contactable with an outer surface C42 of one of the inner link plates C4.

Each of the second chain-supporting portions 22 has a second support surface 22a and a second outer surface 22b. Each of the second support surface 22a and the second outer surface 22b faces in the axial direction D2. The second support surface 22a is arranged to face the first support surface 20a in the axial direction D2. The second support surface 22a is contactable with an outer surface C42 of one of the inner link plates C4.

The first axial center plane CP1 is defined at a center position between the first support surface 20a and the first outer surface 20b in the axial direction D2. The first axial center plane CP1 is perpendicular to the rotational center axis A. While each of the first chain-supporting portions 20 has an asymmetrical shape with respect to the first axial center plane CP1, each of the first chain-supporting portions 20 can have a symmetrical shape with respect to the first axial center plane CP1.

The second axial center plane CP2 is defined at a center position between the second support surface 22a and the second outer surface 22b in the axial direction D2. The second axial center plane CP2 is perpendicular to the rotational center axis A. While each of the second chain-supporting portions 22 has an asymmetrical shape with respect to the second axial center plane CP2, each of the second chain-supporting portions 22 can have a symmetrical shape with respect to the second axial center plane CP2.

Figure 6:
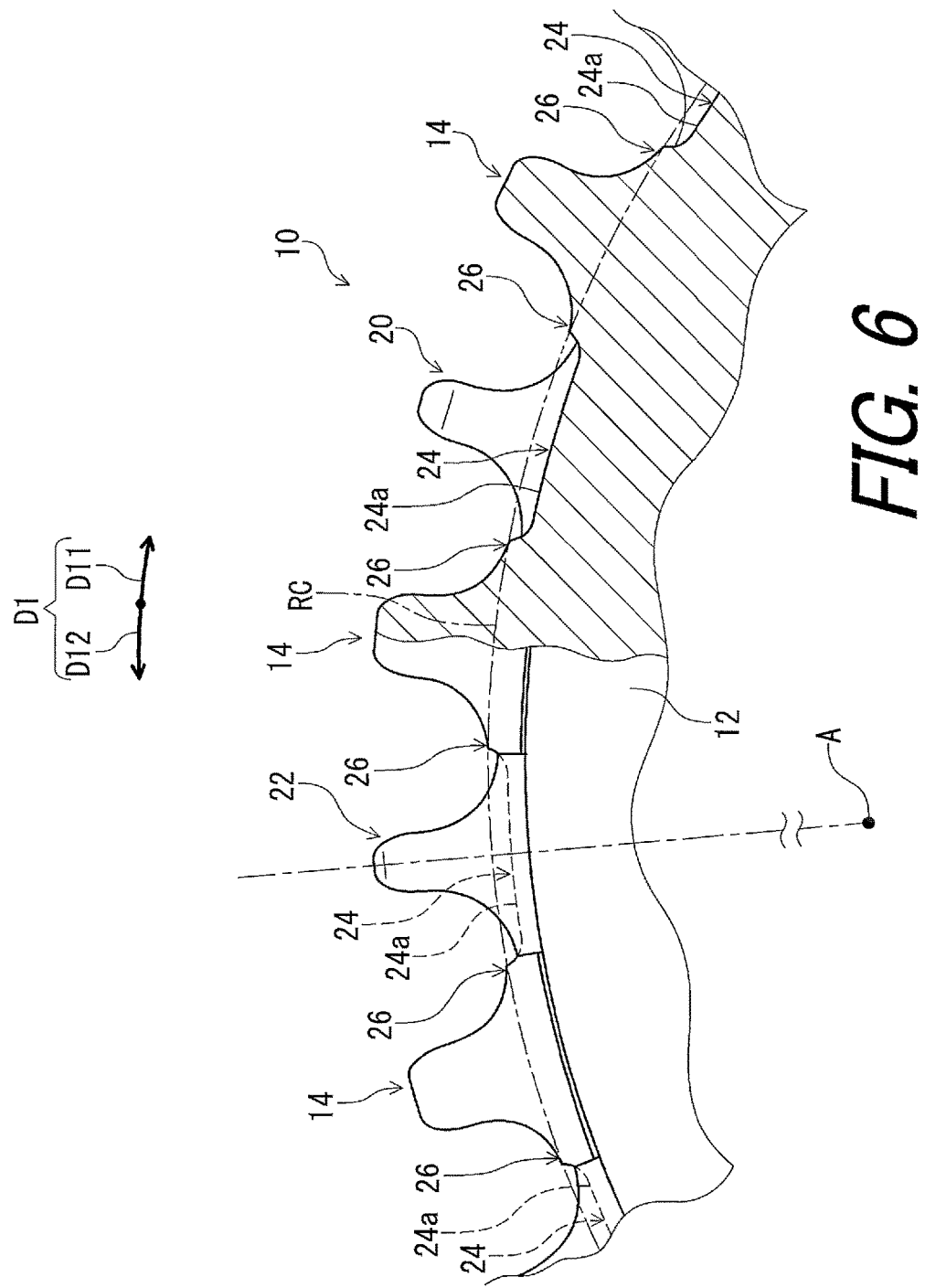
FIG. 6 is a partial enlarged elevational view of the bicycle sprocket illustrated in FIG. 1.

As seen in FIG. 6, each of the first chain-supporting portions 20 is provided between adjacent two of the sprocket teeth 14 when viewed from the axial direction D2 (a direction perpendicular to a paper surface of FIG. 6). Each of the second chain-supporting portions 22 is provided between adjacent two of the sprocket teeth 14 when viewed from the axial direction D2 (the direction perpendicular to the paper surface of FIG. 6).

In the illustrated embodiment, the first chain-supporting portions 20 have the same shape as each other. The second chain-supporting portions 22 have the same shape as each other. Each of the first chain-supporting portions 20 has a shape same as a shape of each of the second chain-supporting portions 22 when viewed from the axial direction D2 (the direction perpendicular to the paper surface of FIG. 6).

As seen in FIG. 6, the bicycle sprocket 10 includes recesses 24 provided between the sprocket teeth 14 in the circumferential direction D1. The sprocket teeth 14 include tooth bottoms 26 defining a root circle RC of the bicycle sprocket 10. The recesses 24 are provided between the tooth bottoms 26 in the circumferential direction D1 of the bicycle sprocket 10. Each of the recesses 24 includes a bottom surface 24a provided radially inward of the root circle RC.

In the illustrated embodiment, the bicycle sprocket 10 is free from an additional sprocket tooth configured to engage with the bicycle chain C at the inner link spaces S2 (FIGS. 4 and 5). Each of the recesses 24 is free from such an additional sprocket tooth. Such an additional sprocket tooth can, however, be provided in the recess 24 between adjacent two of the sprocket teeth 14 in the circumferential direction D1.

With the bicycle sprocket 10, the at least one chain-supporting portion 20 and/or 22 is configured to contact one of the inner link plates C4 of the bicycle chain C without engaging with the bicycle chain C at the inner link spaces S2 each defined between the pair of inner link plates C4 that face each other in the axial direction D2 parallel to the rotational center axis A. The at least one chain-supporting portion 20 and/or 22 is offset from the sprocket teeth 14 in the axial direction D2. Accordingly, it is possible to improve function to hold the bicycle chain C in the bicycle sprocket 10 in comparison with a sprocket which is free from the at least one chain-supporting portion 20 and/or 22. Further, because the bicycle chain C contacts both of the sprocket teeth 14 and the chain-supporting portion 20 and/or 22, it is possible to reduce wear of the sprocket teeth 14 due to contact of a chain with the sprocket teeth 14 in the case of a sprocket being free from the chain-supporting portion 20 and/or 22.

Second Embodiment

A bicycle sprocket 210 in accordance with a second embodiment will be described below referring to FIGS. 7 and 8. Elements having substantially the same function as those in the first embodiment will be numbered the same here, and will not be described again in detail here for the sake of brevity.

Figure 7:
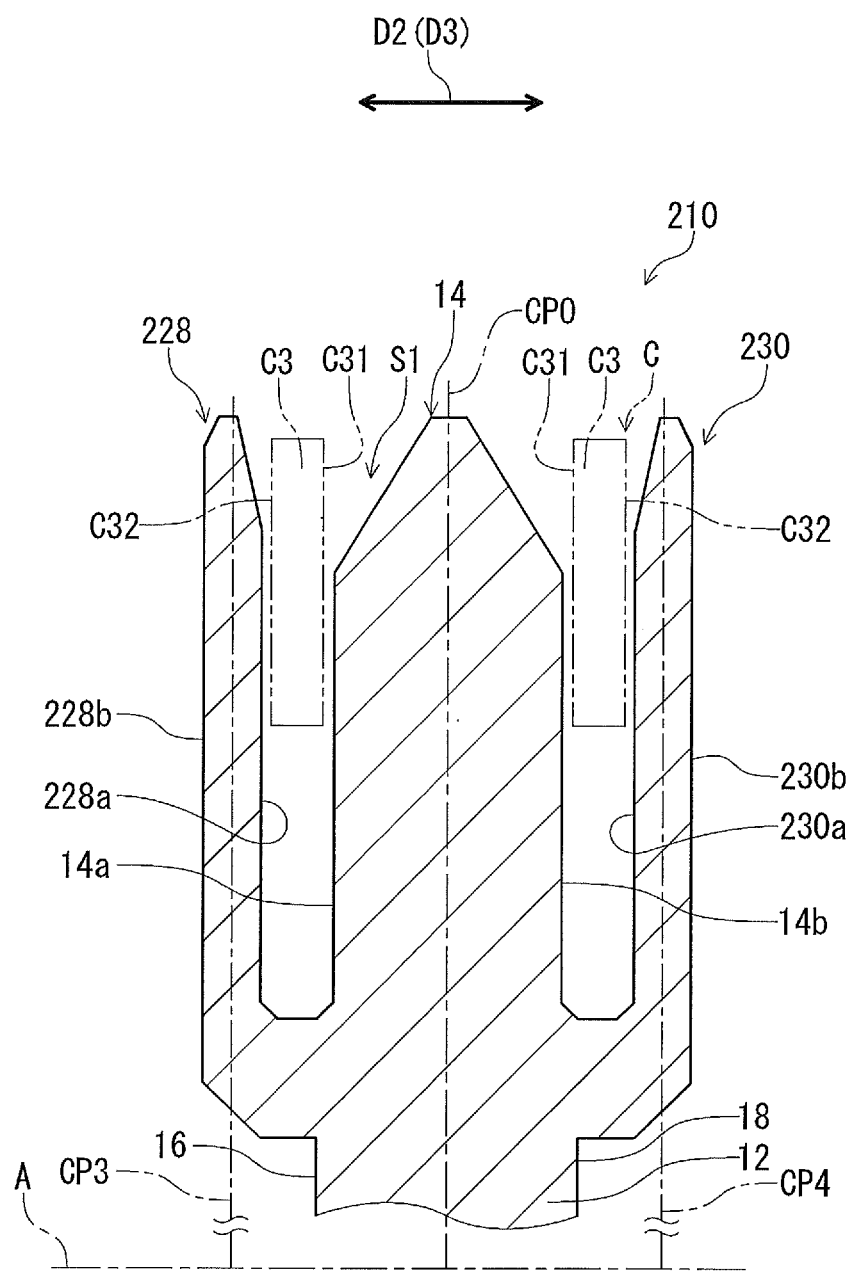
FIG. 7 is a cross-sectional view of a bicycle sprocket in accordance with a second embodiment.

FIG. 7 is a cross-sectional view corresponding to the cross-sectional view of FIG. 3. As seen in FIG. 7, the bicycle sprocket 210 further comprises at least one additional chain-supporting portion 228 and/or 230 configured to contact one of the outer link plates C3 of the bicycle chain C without engaging with the bicycle chain C at the outer link spaces S1 each defined between the pair of outer link plates C3 that face each other in the axial direction D2. In the illustrated embodiment, the at least one additional chain-supporting portion 228 and/or 230 includes a plurality of additional chain-supporting portions 228 and 230 each configured to contact one of the outer link plates C3 of the bicycle chain C without engaging with the bicycle chain C at the outer link spaces S1 each defined between the pair of outer link plates C3 that face each other in the axial direction D2.

The at least one additional chain-supporting portion 228 and/or 230 includes a first additional chain-supporting portion 228 and a second additional chain-supporting portion 230 which are each configured to contact one of the outer link plates C3 of the bicycle chain C without engaging with the bicycle chain C at the outer link spaces S1 each defined between the pair of outer link plates C3 that face each other in the axial direction D2. In the illustrated embodiment, the additional chain-supporting portions 228 and 230 include a plurality of first additional chain-supporting portions 228 and a plurality of second additional chain-supporting portions 230.

As seen in FIG. 7, the at least one additional chain-supporting portion 228 and/or 230 is positioned closer to one of the first axial side 16 and the second axial side 18 than the other of the first axial side 16 and the second axial side 18 in the axial direction D2. In the illustrated embodiment, the first additional chain-supporting portion 228 is positioned closer to the first axial side 16 than the second axial side 18 in the axial direction D2. The second additional chain-supporting portion 230 is positioned closer to the second axial side 18 than the first axial side 16 in the axial direction D2.

Figure 8:
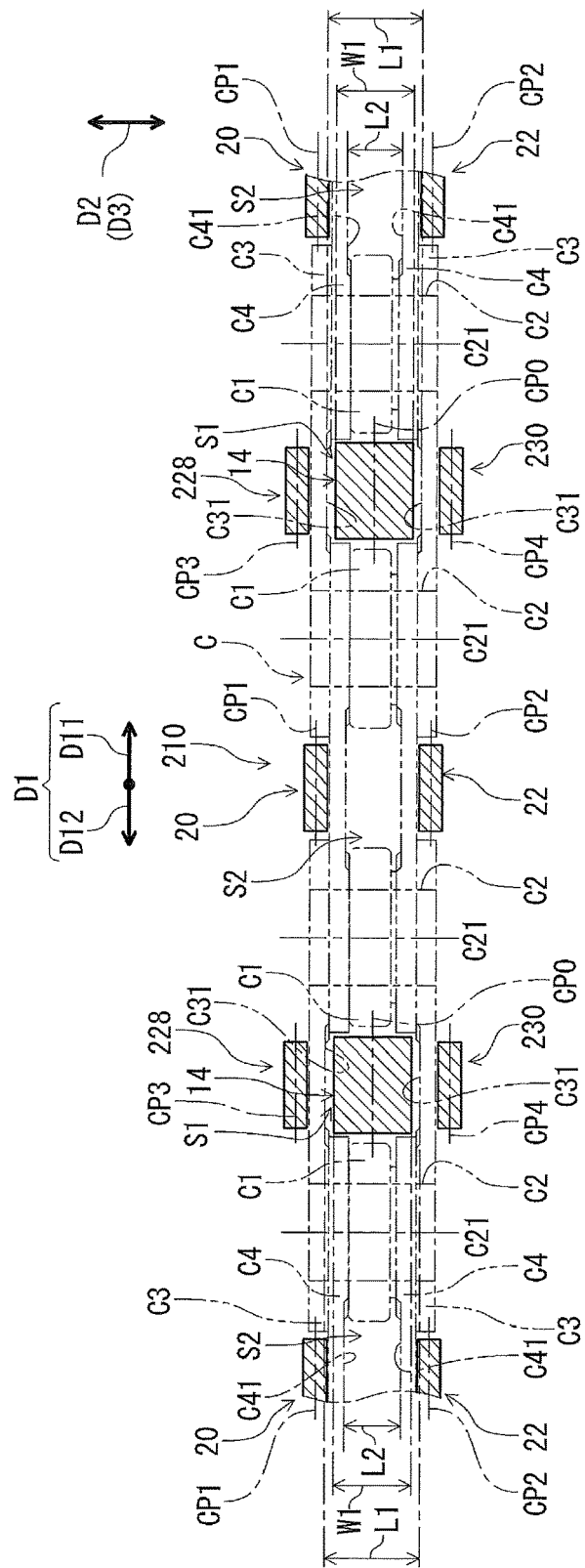
FIG. 8 is a cross-sectional view of the bicycle sprocket illustrated in FIG. 7.

As seen in FIG. 8, the at least one additional chain-supporting portion 228 and/or 230 is offset from the sprocket teeth 14 in the axial direction D2. In the illustrated embodiment, each of the first additional chain-supporting portions 228 is offset from the sprocket teeth 14 in the axial direction D2. Each of the second additional chain-supporting portions 230 is offset from the sprocket teeth 14 in the axial direction D2.

The first additional chain-supporting portion 228 is preferably aligned with the second additional chain-supporting portion 230 in the axial direction D2. The sprocket tooth 14 is disposed between the first additional chain-supporting portion 228 and the second additional chain-supporting portion 230 in the axial direction D2. The first additional chain-supporting portions 228 are arranged to face the sprocket teeth 14 in the axial direction D2. The second additional chain-supporting portions 230 are arranged to face the sprocket teeth 14 in the axial direction D2.

The first additional chain-supporting portion 228 is disposed at a circumferential position same as a circumferential position of the second additional chain-supporting portion 230 in the circumferential direction D1. The pair of outer link plates C3 are partially disposed between the first additional chain-supporting portion 228 and one of the sprocket teeth 14 and between the second additional chain-supporting portion 230 and one of the sprocket teeth 14 in a state where the bicycle chain C at least partially engages with the sprocket teeth 14.

As seen in FIG. 8, the first additional chain-supporting portions 228 are aligned with each other in the circumferential direction D1. The second additional chain-supporting portions 230 are aligned with each other in the circumferential direction D1. Each of the first additional chain-supporting portions 228 has a third axial center plane CP3 defined at a center position of each of the first additional chain-supporting portions 228 in the axial direction D2. The third axial center planes CP3 are disposed at the same position in the axial direction D2. Each of the second additional chain-supporting portions 230 has a fourth axial center plane CP4 defined at a center position of each of the second additional chain-supporting portions 230 in the axial direction D2. The fourth axial center planes CP4 are disposed at the same position in the axial direction D2.

As seen in FIG. 7, each of the first additional chain-supporting portions 228 has a third support surface 228a and a third outer surface 228b. Each of the third support surface 228a and the third outer surface 228b faces in the axial direction D2. The third support surface 228a is contactable with an outer surface C32 of one of the outer link plates C3.

Each of the second additional chain-supporting portions 230 has a fourth support surface 230a and a fourth outer surface 230b. Each of the fourth support surface 230a and the fourth outer surface 230b faces in the axial direction D2. The fourth support surface 230a is arranged to face the third support surface 228a in the axial direction D2. The fourth support surface 230a is contactable with an outer surface C32 of one of the outer link plates C3.

As seen in FIG. 7, the third axial center plane CP3 is defined at a center position between the third support surface 228a and the third outer surface 228b in the axial direction D2. The third axial center plane CP3 is perpendicular to the rotational center axis A. While each of first additional chain-supporting portions 228 has an asymmetrical shape with respect to the third axial center plane CP3, each of first additional chain-supporting portions 228 can have a symmetrical shape with respect to the third axial center plane CP3.

The fourth axial center plane CP4 is defined at a center position between the fourth support surface 230a and the fourth outer surface 230b in the axial direction D2. The fourth axial center plane CP4 is perpendicular to the rotational center axis A. While each of the second additional chain-supporting portions 230 has an asymmetrical shape with respect to the fourth axial center plane CP4, each of the second additional chain-supporting portions 230 can have a symmetrical shape with respect to the fourth axial center plane CP4.

With the bicycle sprocket 210, the at least one additional chain-supporting portion 228 and/or 230 is configured to contact one of the outer link plates C3 of the bicycle chain C without engaging with the bicycle chain C at the outer link spaces S1 each defined between the pair of outer link plates C3 that face each other in the axial direction D2. Accordingly, it is possible to obtain holding function of the at least one additional chain-supporting portion 228 and/or 230 in addition to the at least one chain-supporting portion 20 and/or 22 in accordance with the first embodiment.

Third Embodiment

A bicycle sprocket 310 in accordance with a third embodiment will be described below referring to FIG. 9. The bicycle sprocket 310 has the same configuration as the bicycle sprocket 10 except for the arrangement of the at least one chain-supporting portion 20 and/or 22. Thus, elements having substantially the same function as those in the above embodiments will be numbered the same here, and will not be described again in detail here for the sake of brevity.

Figure 9:
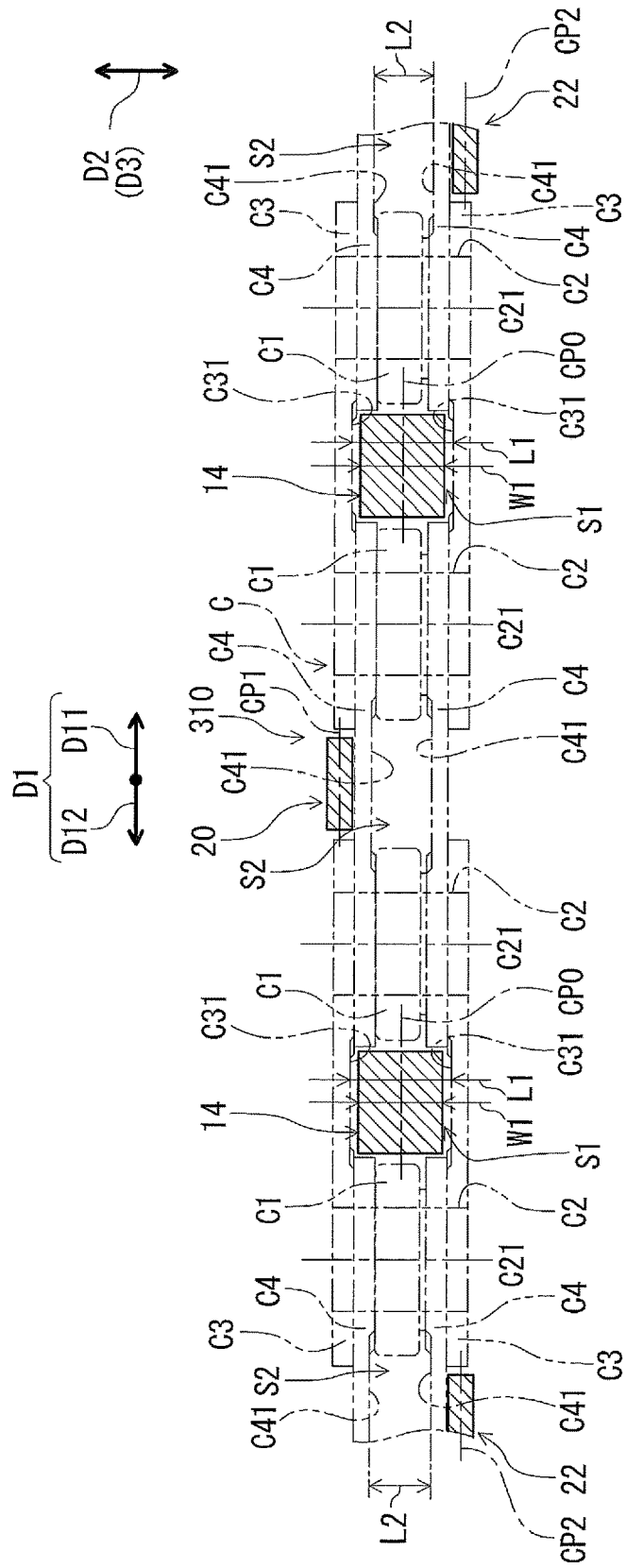
FIG. 9 is a cross-sectional view of a bicycle sprocket in accordance with a third embodiment.

In the bicycle sprocket 310, as seen in FIG. 9, the first chain-supporting portions 20 and the second chain-supporting portions 22 are alternatively arranged in the circumferential direction D1. The first chain-supporting portion 20 is not aligned with the second chain-supporting portion 22 in the axial direction D2. The first chain-supporting portions 20 are partially omitted from the bicycle sprocket 310. The second chain-supporting portions 22 are partially omitted from the bicycle sprocket 310.

With the bicycle sprocket 310, it is possible to obtain the advantageous effect same as that of the bicycle sprocket 10 in accordance with the first embodiment with saving weight of the bicycle sprocket 310.

Fourth Embodiment

A bicycle sprocket 410 in accordance with a fourth embodiment will be described below referring to FIG. 10. The bicycle sprocket 410 has the same configuration as the bicycle sprocket 10 except for the arrangement of the at least one chain-supporting portion 20 and/or 22. Thus, elements having substantially the same function as those in the above embodiments will be numbered the same here, and will not be described again in detail here for the sake of brevity.

Figure 10:
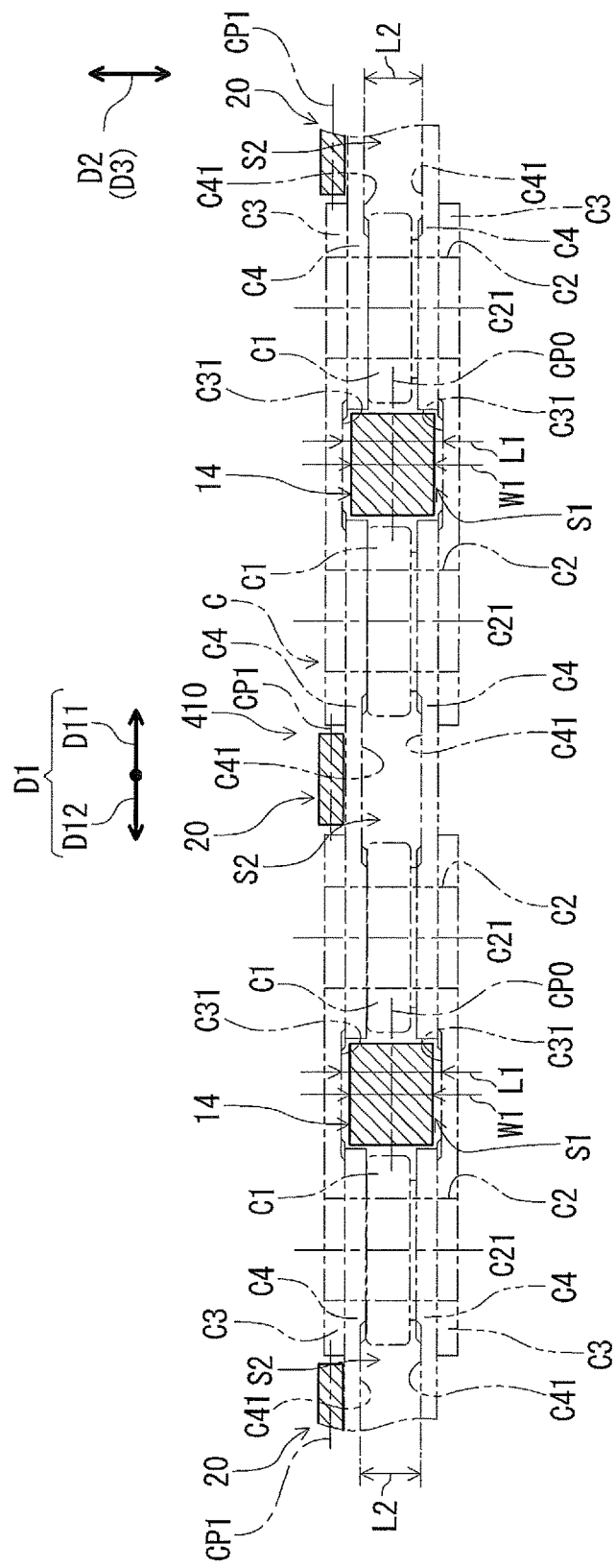
FIG. 10 is a cross-sectional view of a bicycle sprocket in accordance with a fourth embodiment.

In the bicycle sprocket 410, as seen in FIG. 10, the second chain-supporting portions 22 are omitted from the bicycle sprocket 410. While the first chain-supporting portions 20 are circumferentially arranged, the first chain-supporting portions 20 can be partially omitted from the bicycle sprocket 410 if needed and/or desired.

With the bicycle sprocket 410, it is possible to obtain the advantageous effect same as that of the bicycle sprocket 10 in accordance with the first embodiment with saving weight of the bicycle sprocket 410.

Fifth Embodiment

A bicycle sprocket 510 in accordance with a fifth embodiment will be described below referring to FIG. 11. The bicycle sprocket 510 has the same configuration as the bicycle sprocket 10 except for the arrangement of the at least one chain-supporting portion 20 and/or 22. Thus, elements having substantially the same function as those in the above embodiments will be numbered the same here, and will not be described again in detail here for the sake of brevity.

Figure 11:
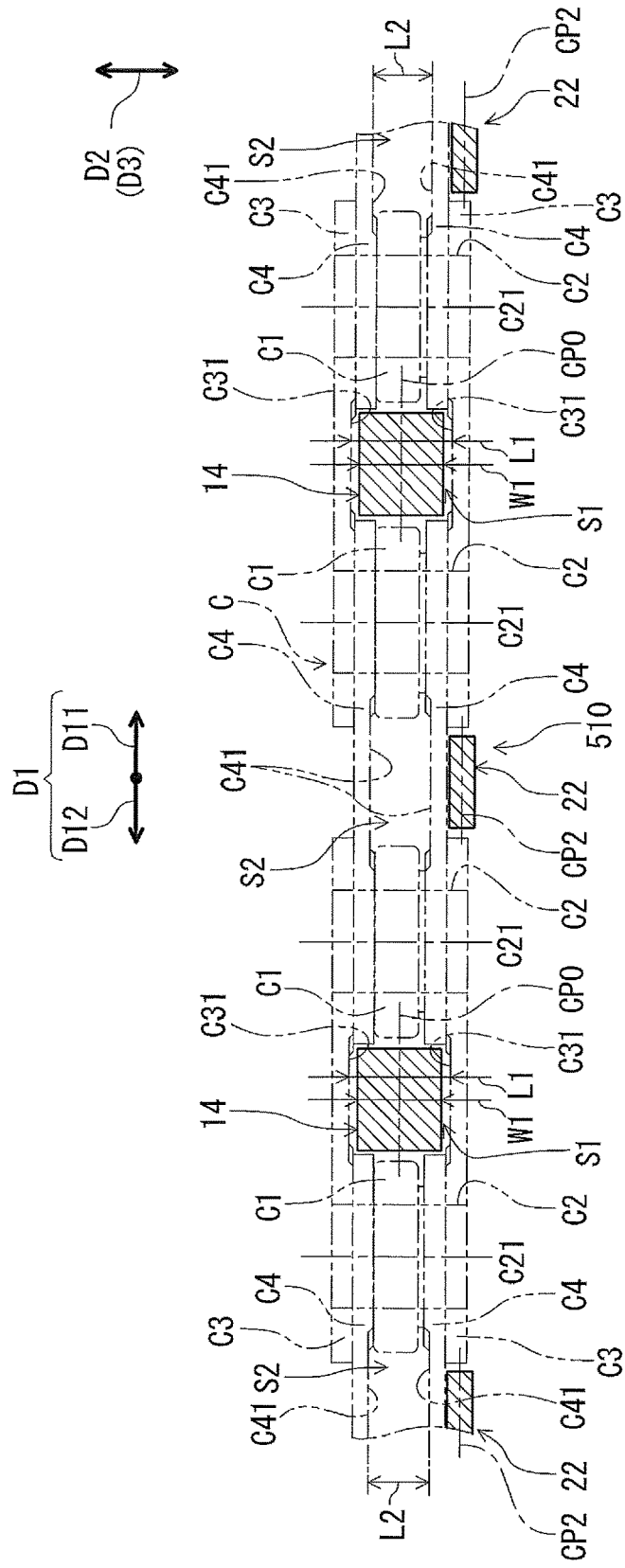
FIG. 11 is a cross-sectional view of a bicycle sprocket in accordance with a fifth embodiment.

In the bicycle sprocket 510, as seen in FIG. 11, the first chain-supporting portions 20 can be omitted from the bicycle sprocket 510. While the second chain-supporting portions 22 are circumferentially arranged, the second chain-supporting portions 22 can be partially omitted from the bicycle sprocket 510 if needed and/or desired.

With the bicycle sprocket 510, it is possible to obtain the advantageous effect same as that of the bicycle sprocket 10 in accordance with the first embodiment with saving weight of the bicycle sprocket 510.

Sixth Embodiment

A bicycle sprocket 610 in accordance with a sixth embodiment will be described below referring to FIGS. 12 and 13. The bicycle sprocket 610 has the same configuration as the bicycle sprocket 10 except for the second chain-supporting portions 22. Thus, elements having substantially the same function as those in the above embodiments will be numbered the same here, and will not be described again in detail here for the sake of brevity.

Figure 12:
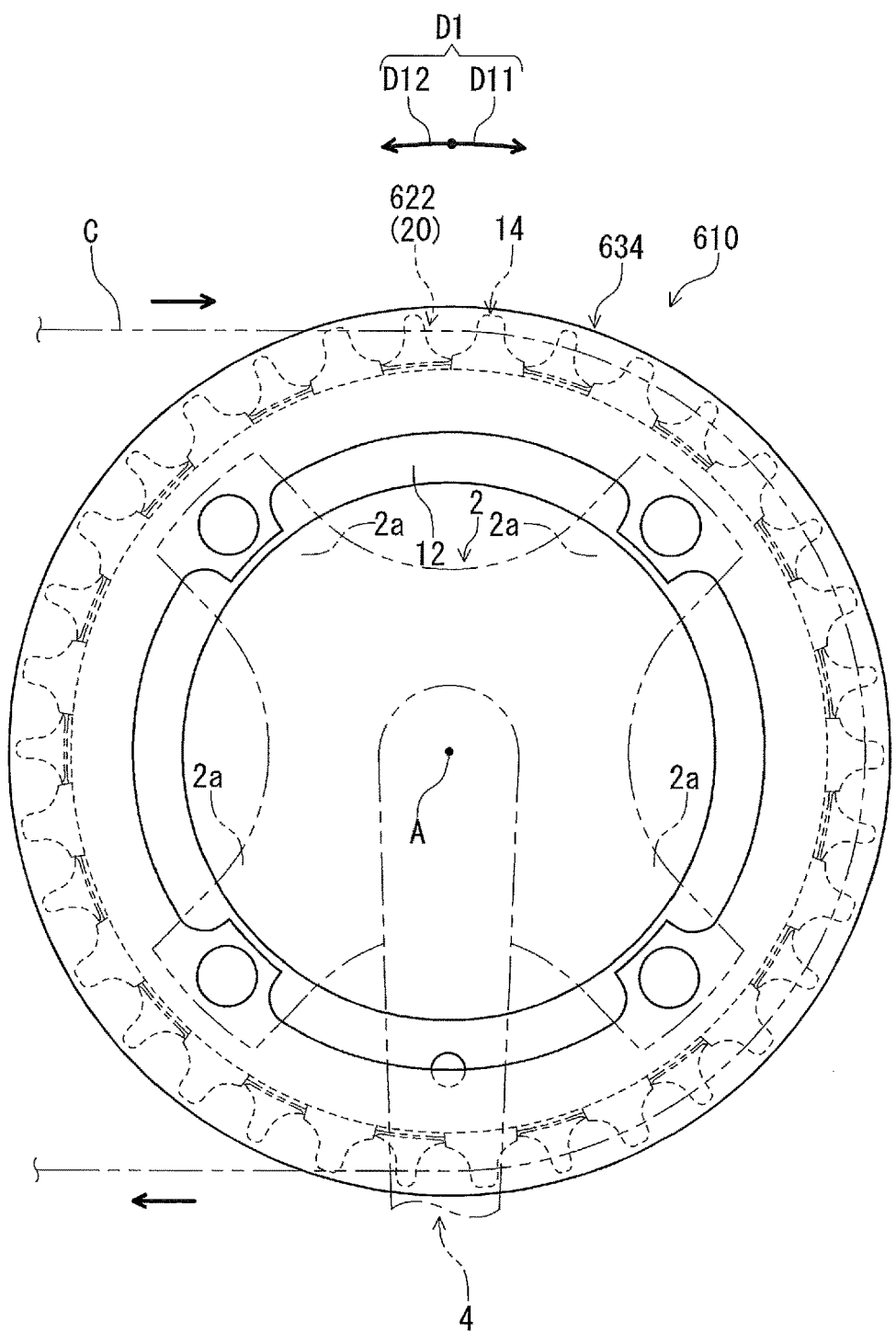
FIG. 12 is an elevational view of a bicycle sprocket in accordance with a sixth embodiment.

As seen in FIG. 12, the bicycle sprocket 610 includes a bash guard 634 configured to be attached to the sprocket body 12 by bolts (not shown). The bash guard 634 has an annular shape and is rotatable together with the sprocket body 12 about the rotational center axis A. The bicycle sprocket 610 comprises second chain-supporting portions 622 instead of the second chain-supporting portions 22. The second chain-supporting portions 622 have a shape same as a shape of the first chain-supporting portions 20 when viewed from the axial direction D2 (a direction perpendicular to a paper surface of FIG. 12).

Figure 13:
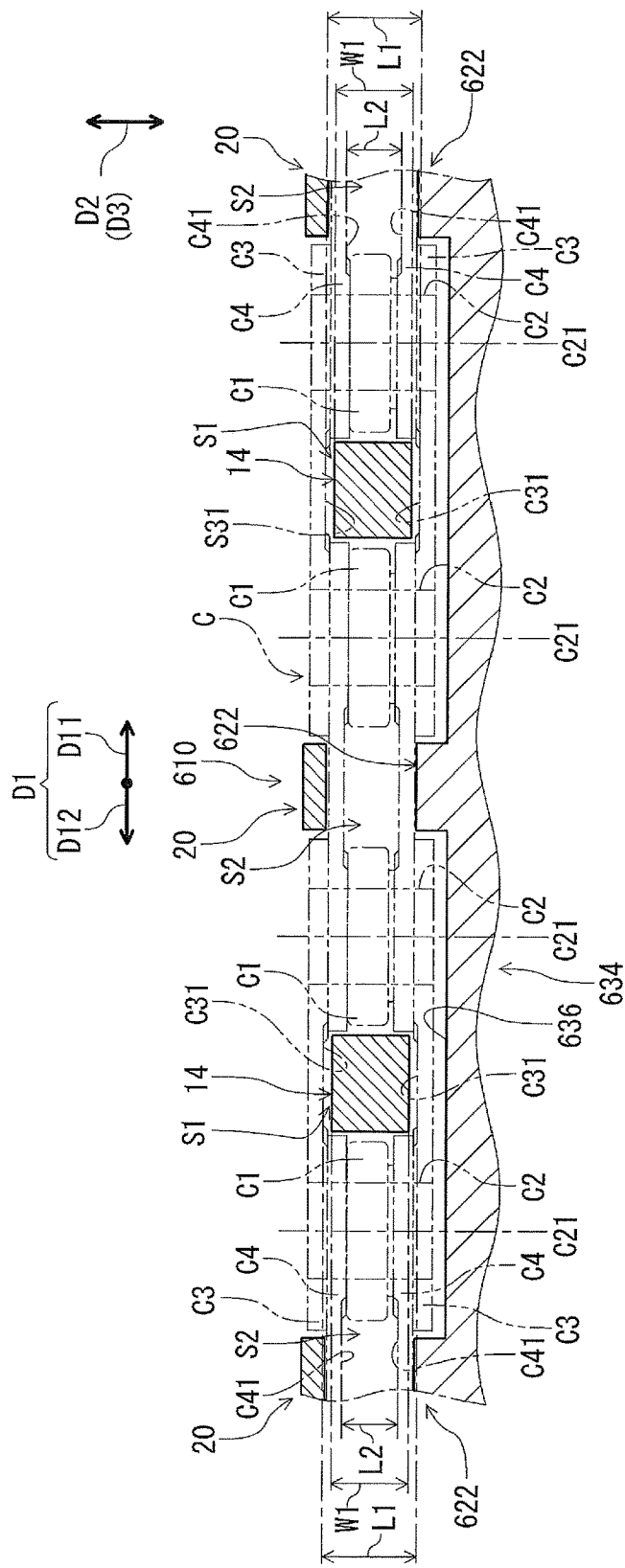
FIG. 13 is a cross-sectional view of the bicycle sprocket illustrated in FIG. 12.

As seen in FIG. 13, the second chain-supporting portions 622 are configured to contact one of the inner link plates C4 of the bicycle chain C without engaging with the bicycle chain C at the inner link spaces S2 each defined between the pair of inner link plates C4 that face each other in the axial direction D2. The second chain-supporting portions 622 and the bash guard 634 are made of a resin material or a metallic material. While the second chain-supporting portions 622 are integrally provided with the bash guard 634 in the illustrated embodiment, the second chain-supporting portions 622 can be separately provided from the bash guard 634 if needed and/or desired.

The bash guard 634 includes an axial surface 636 configured to face the sprocket teeth 14 in the axial direction D2. The axial surface 636 is configured to face one of the outer link plates C3 in the axial direction D2 in a state where the bicycle chain C at least partially engages with the bicycle sprocket 610. Each of the second chain-supporting portions 622 are provided on the axial surface 636. Each of the second chain-supporting portions 622 protrudes from the axial surface 636.

With the bicycle sprocket 610, it is possible to obtain the advantageous effect same as that of the bicycle sprocket 10 in accordance with the first embodiment.

The above embodiments can be at least partially combined with each other if needed and/or desired. In the second embodiment, for example, the first additional chain-supporting portions 228 can be at least partially omitted from the bicycle sprocket 210 as well as the first chain-supporting portions 20 in accordance with the third and fifth embodiments. In the second embodiment, the second additional chain-supporting portions 230 can be at least partially omitted from the bicycle sprocket 210 as well as the second chain-supporting portions 22 in accordance with the third and fourth embodiments. Furthermore, in the sixth embodiment, the second chain-supporting portions 622 can be at least partially omitted from the bicycle sprocket 610 as well as the second chain-supporting portions 22 in accordance with the third and fourth embodiments.

Structures of the bicycle sprockets 10 to 610 in accordance with the first to sixth embodiments can be applied to a rear sprocket and/or a sprocket assembly including a plurality of sprockets for changing gears.

In the above embodiments, the term "attached" or "attaching", as used herein, can encompass configurations in which an element is directly attached to the other element by affixing the element directly to the other element; configurations in which the element is indirectly attached to the other element via the intermediate member(s); and configurations in which one element is integral with the other element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket having a rotational center axis, the bicycle sprocket comprising:
   a sprocket body having an annular shape;
   a plurality of sprocket teeth circumferentially arranged on an outer periphery of the sprocket body; and
   at least one chain-supporting portion configured to contact an axial outer surface of one of a pair of inner link plates of a bicycle chain, the pair of inner link plates have an inner link space not engaging with the at least one chain-supporting portion at the inner link space, the inner link space defined as a gap in an axial direction between the pair of inner link plates that are spaced apart from each other in the axial direction to form the gap, and the inner link plates face each other in the axial direction parallel to the rotational center axis, the at least one chain-supporting portion being offset from the sprocket teeth in the axial direction, wherein
   each of the plurality of sprocket teeth has a chain-engaging axial width that is larger than an axial width of the inner link space, and the chain-engaging axial width of each of the plurality of sprocket teeth is equal to or smaller than an axial width of an outer link space defined between a pair of outer link plates of the bicycle chain, and the at least one chain-supporting portion axially extends beyond an outermost axial side of the sprocket body having the annular shape in the axial direction.

2. The bicycle sprocket according to the claim 1, wherein the at least one chain-supporting portion includes a plurality of chain-supporting portions each configured to contact one of the pair of inner link plates of the bicycle chain without engaging with the bicycle chain at the inner link space defined between the pair of inner link plates that face each other in the axial direction.

3. The bicycle sprocket according to the claim 1, wherein the bicycle sprocket has a first axial side and a second axial side opposite to the first axial side, and the at least one chain-supporting portion is positioned closer to one of the first axial side and the second axial side than the other of the first axial side and the second axial side in the axial direction.

4. The bicycle sprocket according to the claim 1, wherein the bicycle sprocket has a first axial side and a second axial side opposite to the first axial side, the at least one chain-supporting portion includes a first chain-supporting portion and a second chain-supporting portion, the first chain-supporting portion being configured to contact the axial outer surface of one of the pair of inner link plates of the bicycle chain without engaging with the bicycle chain at the inner link space defined between the pair of inner link plates that face each other in the axial direction, the second chain-supporting portion being configured to contact an additional axial outer surface of another of the pair of inner link plates of the bicycle chain without engaging with the bicycle chain at the inner link space, the first chain-supporting portion is positioned closer to the first axial side than the second axial side in the axial direction, and the second chain-supporting portion is positioned closer to the second axial side than the first axial side in the axial direction.

5. The bicycle sprocket according to the claim 4, wherein the first chain-supporting portion is aligned with the second chain-supporting portion in the axial direction.

6. The bicycle sprocket according to the claim 1, further comprising:

at least one additional chain-supporting portion configured to contact one of a pair of outer link plates of the bicycle chain without engaging with the bicycle chain at outer link space defined between the pair of outer link plates that face each other in the axial direction, wherein the at least one additional chain-supporting portion is offset from the sprocket teeth in the axial direction.

7. The bicycle sprocket according to the claim 6, wherein the at least one additional chain-supporting portion includes a plurality of additional chain-supporting portions each configured to contact one of the pair of outer link plates of the bicycle chain without engaging with the bicycle chain at the outer link space defined between the pair of outer link plates that face each other in the axial direction.

8. The bicycle sprocket according to the claim 6, wherein the bicycle sprocket has a first axial side and a second axial side opposite to the first axial side, and the at least one additional chain-supporting portion is positioned closer to one of the first axial side and the second axial side than the other of the first axial side and the second axial side in the axial direction.

9. The bicycle sprocket according to the claim 6, wherein the bicycle sprocket has a first axial side and a second axial side opposite to the first axial side, the at least one additional chain-supporting portion includes a first additional chain-supporting portion and a second additional chain-supporting portion which are each configured to contact one of the pair of outer link plates of the bicycle chain without engaging with the bicycle chain at the outer link space defined between the pair of outer link plates that face each other in the axial direction, the first additional chain-supporting portion is positioned closer to the first axial side than the second axial side in the axial direction, and the second additional chain-supporting portion is positioned closer to the second axial side than the first axial side in the axial direction.

10. The bicycle sprocket according to the claim 9, wherein the first additional chain-supporting portion is aligned with the second additional chain-supporting portion in the axial direction.

11. The bicycle sprocket according to the claim 1, wherein at least one of the plurality of sprocket teeth is configured to face an axial inner surface of at least one of the pair of outer link plates of the bicycle chain in the axial direction.

12. The bicycle sprocket according to the claim 1, wherein the at least one chain-supporting portion has a support axial width defined in the axial direction, and the support axial width is smaller than the chain-engaging axial width.

13. The bicycle sprocket according to the claim 1, wherein the plurality of sprocket teeth includes tooth bottoms defining a root circle of the bicycle sprocket, and each of the plurality of sprocket teeth has
a radial length defined radially outward from the root circle, the radial length being larger than the chain-engaging axial width.

14. The bicycle sprocket according to the claim 1, wherein the plurality of sprocket teeth includes tooth bottoms defining a root circle of the bicycle sprocket, and the at least one chain-supporting portion has
a support axial width defined in the axial direction, and
a radial length defined radially outward from the root circle and larger than the support axial width.

15. The bicycle sprocket according to the claim 1, wherein each of the plurality of sprocket teeth has a reference axial center plane defined at a center position of each of the plurality of sprocket teeth in the axial direction, the at least one chain-supporting portion has an axial center plane defined at a center position of the at least one chain-supporting portion in the axial direction, and the axial center plane of the at least one chain-supporting portion is offset from the reference axial center plane in the axial direction.

16. The bicycle sprocket according to the claim 1, wherein each of the plurality of sprocket teeth includes
a first chain-engaging surface facing in the axial direction, and
a second chain-engaging surface facing in the axial direction, the second chain-engaging surface being opposite to the first chain-engaging surface in the axial direction.

17. The bicycle sprocket according to the claim 16, wherein
the at least one chain-supporting portion includes a support surface facing in the axial direction, the support surface being contactable with one of the pair of inner link plates of the bicycle chain, and
the support surface is offset from the first chain-engaging surface and the second chain-engaging surface in the axial direction.

18. The bicycle sprocket according to the claim 16, wherein
the first chain-engaging surface and the second chain-engaging surface are respectively configured to face the pair of outer link plates in the axial direction.

19. The bicycle sprocket according to the claim 1, wherein
the at least one chain-supporting portion includes a support surface facing in the axial direction to contact the axial outer surface of one of the pair of inner link plates.

20. The bicycle sprocket according to the claim 1,
wherein, when the at least one chain-supporting portion contacts the axial outer surface of the one of the pair of inner link plates, no structure of said bicycle sprocket engages with the bicycle chain at the inner link space defined between the one of a pair of inner link plates.

21. The bicycle sprocket according to the claim 1,
wherein at least one sprocket tooth of the plurality of sprocket teeth has a first profile when viewed in the axial direction;
wherein the at least one chain-supporting portion has a second profile when viewed in the axial direction; and
wherein the first profile is different from the second profile.

\* \* \* \* \*